United States Patent
Kelapure et al.

(10) Patent No.: US 8,296,523 B2
(45) Date of Patent: Oct. 23, 2012

(54) DUAL TIMEOUT CACHING

(75) Inventors: Rohit D. Kelapure, Durham, NC (US); Gautam Singh, Durham, NC (US); Christian Steege, Zurich (CH); Filip R. Zawadiak, Warszawa (PL)

(73) Assignee: International Business Machines Corporation, Armonk, NY (US)

( * ) Notice: Subject to any disclaimer, the term of this patent is extended or adjusted under 35 U.S.C. 154(b) by 444 days.

(21) Appl. No.: 12/651,306

(22) Filed: Dec. 31, 2009
(Under 37 CFR 1.47)

(65) Prior Publication Data
US 2011/0161598 A1    Jun. 30, 2011

(51) Int. Cl.
*G06F 12/00* (2006.01)
(52) U.S. Cl. ............................. 711/136; 711/E12.017
(58) Field of Classification Search ..................... None
See application file for complete search history.

(56) References Cited

U.S. PATENT DOCUMENTS

| | | | |
|---|---|---|---|
| 5,802,278 A * | 9/1998 | Isfeld et al. | 709/249 |
| 2009/0198899 A1 * | 8/2009 | Revanuru | 711/128 |
| 2010/0228635 A1 * | 9/2010 | Ghosh et al. | 705/14.71 |

OTHER PUBLICATIONS

Wang, P., Hopper, N., Osipkov, I., and Kim, Y., Myrmic: Secure and Robust DHT Routing, http://www.techrepublic.com/whitepapers/myrmic-secure-and-robust-dht-routing/2701523 Jun. 2007.*
Acer, U., Kalyanaraman, S., and Abouzeid, A., Weak State Routing for Large Scale Dynamic Networks, MobiCom 2007, Sep. 9-14, 2007, Montreal, Quebec, Canada, ACM 2007.*

* cited by examiner

*Primary Examiner* — Edward Dudek, Jr.
*Assistant Examiner* — John P Fishburn
(74) *Attorney, Agent, or Firm* — Steven M. Greenberg, Esq.; Carey, Rodriguez, Greenberg & O'Keefe

(57) ABSTRACT

Embodiments of the present invention provide a method, system and computer program product for dual timer fragment caching. In an embodiment of the invention, a dual timer fragment caching method can include establishing both a soft timeout and also a hard timeout for each fragment in a fragment cache. The method further can include managing the fragment cache by evicting fragments in the fragment cache subsequent to a lapsing of a corresponding hard timeout. The management of the fragment cache also can include responding to multiple requests by multiple requestors for a stale fragment in the fragment cache with a lapsed corresponding soft timeout by returning the stale fragment from the fragment cache to some of the requestors, by retrieving and returning a new form of the stale fragment to others of the requestors, and by replacing the stale fragment in the fragment cache with the new form of the stale fragment with a reset soft timeout and hard timeout.

9 Claims, 1 Drawing Sheet

DUAL TIMEOUT CACHING

BACKGROUND OF THE INVENTION

1. Field of the Invention

The present invention relates to cache memory management and more particularly to cache tuning.

2. Description of the Related Art

Memory cache technologies have formed an integral part of computer engineering and computer science for well over two decades. Initially embodied as part of the underlying hardware architecture of a data processing system, data caches and program instruction caches store often-accessed data and program instructions in fast memory for subsequent retrieval in lieu of retrieving the same data and instructions from slower memory stores. Consequently, substantial performance advantages have been obtained through the routine incorporation of cache technologies in computer main board designs.

Notably, the inherent principles of the data cache have been applied far beyond the realm of the computer main board. In this regard, caching technologies have been implemented across numerous computing systems ranging from soft database management systems, to hard drive controlling technologies. Data caching technologies have become particularly important in the context of content delivery systems in which often-requested content can be cached for frequent distribution to requesting computing clients.

In the prototypical content delivery system, content can be delivered from an origin server to a community of content consuming clients. Content typically can be delivered according to a request-response paradigm in which the content consuming clients initiate a request for content to which one or more origin servers can respond with the requested content. Generally, one or more content caches can be disposed in the intermediate communications path between the content consuming clients and content servers in order to enhance the responsiveness of the servers to any single client request and to reduce the processing burden placed upon the origin server.

Content caches often cache fragments of content, such as renderable or computable portions of content in a content delivery system. Subsequent requests for the cached content by multiple different users can be satisfied by the cache, thus resulting in a substantial performance boost for content throughput. Even still, at some point, cache entries in a fragment cache can become stale. As such, cache entries for fragments can be temporally limited in the cache and expire after a period of time has elapsed. Subsequently, a request for previously cached content that has since expired requires a new retrieval of a requested fragment and the re-population of the cache with the newly retrieved fragment. The net result is a decline in throughput while requesting clients await the refreshing of the requested fragment in the cache.

Commercially available caching systems account for the decline in throughput resulting from the hard time outs of a temporally configured cache through the use of soft-time outs for stale cache entries. In this regard, it is well known to handle a fragment request for content that has become stale in the cache by serving the stale entry to all requesting clients but one. The requesting client not receiving the stale cache entry receives a newly recomputed fragment that is subsequently used to refresh the cache entry. In this way, only one of several requestors suffers the latency of refreshing the cache entry while throughput performance remains high. Even still, at some point, a stale cache entry of a fragment becomes so stale as to result in the retrieval of the cached fragment that is substantially deviant from a current state of the fragment.

BRIEF SUMMARY OF THE INVENTION

Embodiments of the present invention address deficiencies of the art in respect to soft timeout fragment caching and provide a novel and non-obvious method, system and computer program product for dual timer fragment caching. In an embodiment of the invention, a dual timer fragment caching method can include establishing both a soft timeout and also a hard timeout for each fragment in a fragment cache. The soft timeout can indicate a period of time subsequent to a lapsing of which a corresponding fragment becomes stale. The hard timeout in turn can indicate a period of time subsequent to a lapsing of which a corresponding fragment is so stale as to be evicted from the fragment cache. The method further can include managing the fragment cache by evicting fragments in the fragment cache subsequent to a lapsing of a corresponding hard timeout. The management of the fragment cache also can include responding to multiple requests by multiple requestors for a stale fragment in the fragment cache with a lapsed corresponding soft timeout by returning the stale fragment from the fragment cache to some of the requestors, by retrieving and returning a new form of the stale fragment to others of the requestors, and by replacing the stale fragment in the fragment cache with the new form of the stale fragment with a reset soft timeout and hard timeout.

Additional aspects of the invention will be set forth in part in the description which follows, and in part will be obvious from the description, or may be learned by practice of the invention. The aspects of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE SEVERAL VIEWS OF THE DRAWINGS

The accompanying drawings, which are incorporated in and constitute part of this specification, illustrate embodiments of the invention and together with the description, serve to explain the principles of the invention. The embodiments illustrated herein are presently preferred, it being understood, however, that the invention is not limited to the precise arrangements and instrumentalities shown, wherein.

DETAILED DESCRIPTION OF THE INVENTION

Embodiments of the invention provide for dual timeout caching in a content retrieval data processing system. In accordance with an embodiment of the invention, content fragments retrieved for content in response to different cache requests can be cached and both a soft timeout and a hard timeout can be assigned to each of the cached content fragments. Subsequent requests for the cached fragments can be serviced from the cached fragments. Upon expiration of the soft timeout for a cached fragment, a subsequent set of requests can be serviced from the cached fragment, while only a single request can be serviced from a newly computed form of the cached fragment. Thereafter, the cached fragment can be replaced with the newly computed form of the cached fragment. However, upon expiration of the hard timeout assigned to the cached fragment, the cached fragment can be evicted from the cache.

Figure 1:
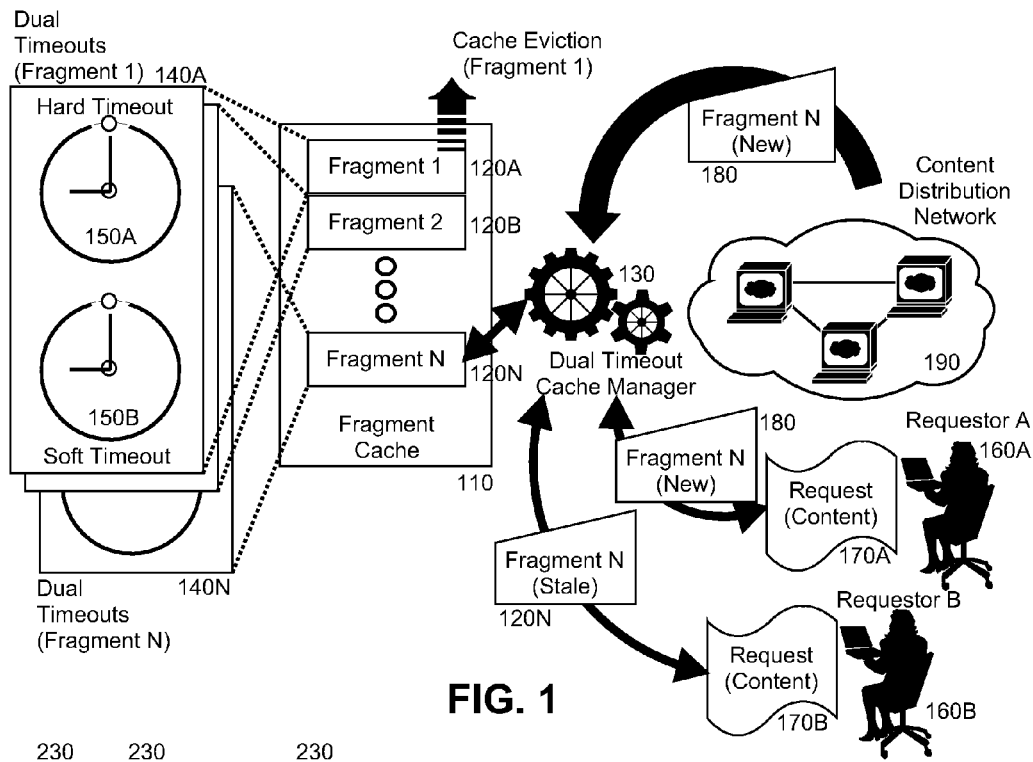
FIG. 1 is a pictorial illustration of a process for dual timeout caching.

In further illustration, FIG. 1 is a pictorial illustration of a process for dual timeout caching. As shown in FIG. 1, different fragments 120A, 120B, 120N for content can be cached in a fragment cache 110. Each fragment 120A, 120B, 120N can have associated respectively therewith dual timeouts 140A, 140B, 140N. Each of the dual timeouts 140A, 140B, 140N can include a soft timeout 150B indicating when a corresponding one of the fragments 120A, 120B, 120N has become stale, and a hard timeout 150A indicating when a corresponding one of the fragments 120A, 120B, 120N is to be evicted from the fragment cache 110.

A dual timeout cache manager 130 can receive request for content 170A, 170B from different requestors 160A, 160B implicating the retrieval of one of the fragments 120A, 120B, 120N in the fragment cache 110. By way of example, supposing that fragment 120A has associated therewith a hard timeout 150A in corresponding dual timeouts 140A that has lapsed. In response to the lapsing of the hard timeout 150B, the associated fragment 120A shall be evicted from the fragment cache 110. Notwithstanding, to the extent that the hard timeout 150A in corresponding dual timeouts 140N for fragment 120N has not lapsed, but the soft timeout 150B for the associated fragment 120N has lapsed, then the associated fragment 120N is deemed stale.

As such, in response to receiving the requests 170A, 170B implicating the retrieval of the fragment 120N, a first requestor 160 can receive the now stale form of the fragment 120N in the fragment cache 110. However, the other requestor 160B can receive a new form of the fragment N 180 retrieved from or computed within content distribution network 190. Additionally, the stale form of the fragment 120N can be replaced in the fragment cache 110 with the new form of the fragment 180 and the dual timeouts 140N can be reset accordingly. In this way, throughput can be maintained for at least the first requestor 160A while assuring that the fragment 140N is refreshed in the fragment cache 110 and that none of the fragments 120A, 120B, 120N in the fragment cache 110 become too stale.

Figure 2:
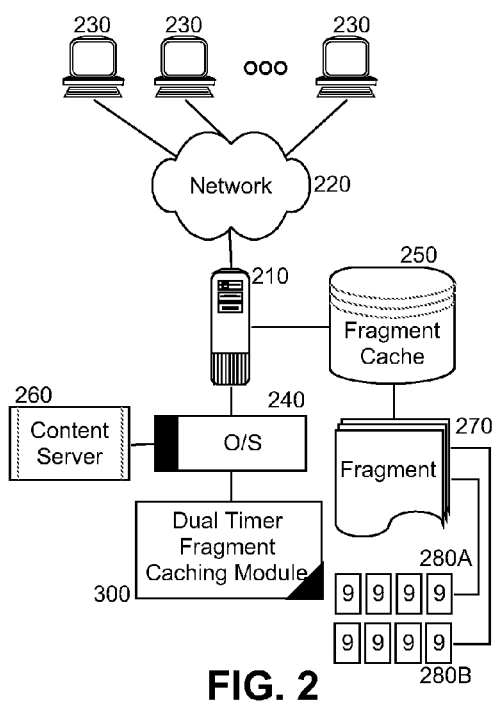
FIG. 2 is a schematic illustration of a content retrieval data processing system configured for dual timeout caching; and, FIG. 3 is a flow chart illustrating a process for dual timeout caching in a content retrieval data processing system.

The process described in connection with FIG. 1 can be implemented in a content retrieval data processing system. In further illustration, FIG. 2 is a schematic illustration of a content retrieval data processing system configured for dual timeout caching. The system can include a host server 210 configured for communicative coupling to different client computing devices 230 over computer communications network 220. The host server 210 can support the execution of an operating system 240 that in turn can host the operation of a content server 260 serving content on request to requestors through respective client computing devices 230. The host server 210 can be coupled to a fragment cache 250 of cached fragments 270 for requested content such that the content server 260 can respond to different requests for content when possible by seeking the fragments of the content in the fragment cache 250 before seeking to computer or retrieve the fragments from a content source over the computer communications network 220.

Each of the cached fragments 270 can have associated therewith both a soft timeout 280A and a hard timeout 280B. The soft timeout 280A, once lapsed can indicate that a corresponding one of the cached fragments 270 has become stale. By comparison, the hard timeout 280B, once lapsed can indicate that a corresponding one of the cached fragments 270 is to be evicted from the fragment cache 250. Of note, dual timer fragment caching module 300 can be coupled to the fragment cache 250 by way of the host server 210 and can manage the servicing of requests for the cached fragments 270 in the fragment cache 250 according to both the soft timeout 280A and the hard timeout 280B.

In this regard, the dual timer fragment caching module 300 can include program code that when executed in memory by a processor of the host server 210 can respond to the lapsing of a hard timeout 280B of a corresponding one of the cached fragments 270 by evicting the corresponding one of the cached fragments 270 from the fragment cache 250. Additionally, the program code of the module 300 when executed by the processor of the host server 210 can receive different requests for a selected one of the cached fragments 270 in the fragment cache 250 and, in response, if an associated soft timeout 280A has lapsed, the corresponding one of the cached fragments 270, though stale, can be returned to most if not all requestors excepting for at least one requestor.

In respect to the at least one requestor, a new form of the corresponding one of the cached fragments 270 can be retrieved and returned to the at least one requestor. Additionally, the stale from of the corresponding one of the cached fragments 270 can be replaced with the newly retrieved form of the corresponding one of the cached fragments 270 in the fragment cache 250. Finally, both the soft timeout 280A and the hard timeout 280B for the newly retrieved form of the corresponding one of the cached fragments 270 in the fragment cache 250 can be reset.

Figure 3:
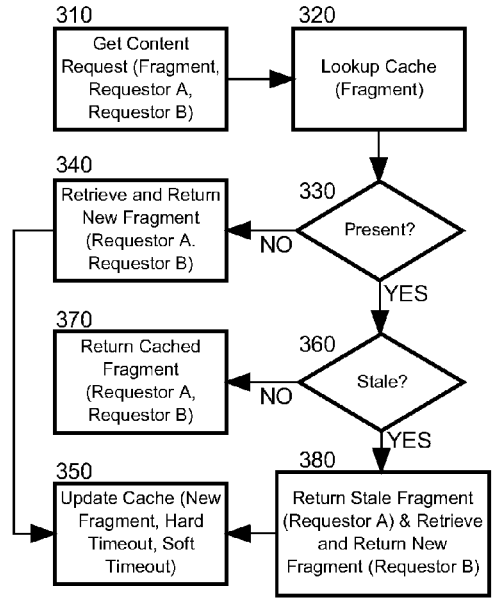

In exemplary illustration of the operation of the dual timer fragment caching module 300, FIG. 3 is a flow chart illustrating a process for dual timeout caching in a content retrieval data processing system with respect to two different requestors of content. Beginning in block 310, a content request implicating a fragment can be received from two different requestors: Requestor A and Requestor B. In block 320, a fragment cache can be inspected for the presence of the requested fragment. In decision block 330, it can be determined if the fragment is present in the fragment cache. If not, in block 340, the requested fragment can be retrieved or computed as the case may be, and returned to both Requestor A and Requestor B. Subsequently, in block 350, the fragment cache can be updated with the retrieved and/or computed fragment. Otherwise, in decision block 330 if it is determined that the fragment is present in the fragment cache, the process can continue through decision block 360.

Once it has been determined that the requested fragment is present in the fragment cache, in decision block 360 it can be determined whether or not the requested fragment in the fragment cache has become stale by virtual of a lapsed soft timeout. If not, in block 370 the cached fragment can be returned to both Requestor A and Requestor B. Otherwise, in block 380 the stale fragment can be returned to Requestor A, however, the requested fragment can be retrieved or computed as the case may be, and returned to Requestor B. Thereafter, in block 350, the fragment cache can be updated with the retrieved and/or computed fragment. In this way, Requestor A can experience desirable throughput and only Requestor B experiences the latency resulting from a cache miss. Neither Requestor A nor Requestor B, though, will be subject to retrieving from the fragment cache a fragment so stale as to be deficient due to the eviction of cached fragments with lapsed hard timeouts.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, radiofrequency, and the like, or any suitable combination of the foregoing. Computer program code for carrying out operations for aspects of the present invention may be written in any combination of one or more programming languages, including an object oriented programming language and conventional procedural programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention have been described above with reference to flowchart illustrations and/or block diagrams of methods, apparatus (systems) and computer program products according to embodiments of the invention. In this regard, the flowchart and block diagrams in the Figures illustrate the architecture, functionality, and operation of possible implementations of systems, methods and computer program products according to various embodiments of the present invention. For instance, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It also will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks. The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Finally, the terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Having thus described the invention of the present application in detail and by reference to embodiments thereof, it will be apparent that modifications and variations are possible without departing from the scope of the invention defined in the appended claims as follows:

We claim:

1. A dual timer fragment caching method comprising:

establishing both a soft timeout and also a hard timeout for each fragment in a fragment cache, the soft timeout indicating a period of time subsequent to a lapsing of which a corresponding fragment becomes stale, the hard timeout indicating a period of time subsequent to a lapsing of which a corresponding fragment is so stale as to be evicted from the fragment cache; and, managing the fragment cache by a dual timer fragment caching module executing in memory by a processor of a host server, (A) the module evicting fragments in the fragment cache subsequent to a lapsing of a corresponding hard timeout, and (B) the module responding to multiple requests by multiple requestors for a stale fragment in the fragment cache with a lapsed corresponding soft timeout by returning the stale fragment from the fragment cache to some of the requestors, by retrieving and returning a new form of the stale fragment to others of the requestors, and by replacing the stale fragment in the fragment cache with the new form of the stale fragment with a reset soft timeout and hard timeout.

2. The method of claim 1, wherein managing the fragment cache by a dual timer fragment caching module comprises:

evicting fragments in the fragment cache subsequent to a lapsing of a corresponding hard timeout; and, responding to multiple requests by multiple requestors for a stale fragment in the fragment cache with a lapsed corresponding soft timeout by returning the stale fragment from the fragment cache to all of the requestors but one of the requestors, by retrieving and returning a new form of the stale fragment to the one of the requestors, and by replacing the stale fragment in the fragment cache with the new form of the stale fragment with a reset soft timeout and hard timeout.

3. The method of claim 1, wherein managing the fragment cache by a dual timer fragment caching module further comprises responding to multiple requests by multiple requestors for a fragment in the fragment cache that is not stale and lacks a lapsed corresponding soft timeout by returning the fragment from the fragment cache to all of the requestors.

4. The method of claim 1, wherein managing the fragment cache by a dual timer fragment caching module further comprises responding to multiple requests by multiple requestors for a fragment not in the fragment cache by retrieving and returning the fragment to the requestors, and by adding the retrieved fragment to the fragment cache with a corresponding soft timeout and hard timeout.

5. A content retrieval data processing system configured for dual timeout caching, the system comprising:

a host server with processor and memory;

a content server executing in the host server;

a fragment cache coupled to the content server and comprising a plurality of cached fragments, each of the cached fragments being associated with dual timers, the dual timers comprising both a soft timeout and also a hard timeout for an associated one of the fragments; and, a dual timer fragment caching module coupled to the fragment cache and the content server, the module comprising program code enabled to manage the fragment cache by (A) evicting fragments in the fragment cache subsequent to a lapsing of a corresponding hard timeout, and (B) responding to multiple requests by multiple requestors for a stale fragment in the fragment cache with a lapsed corresponding soft timeout by returning the stale fragment from the fragment cache to some of the requestors, by retrieving and returning a new form of the stale fragment to others of the requestors, and by replacing the stale fragment in the fragment cache with the new form of the stale fragment with a reset soft timeout and hard timeout.

6. A computer program product comprising a computer usable storage medium embodying computer usable program code for dual timer fragment caching, the computer program product comprising:

computer usable program code for establishing both a soft timeout and also a hard timeout for each fragment in a fragment cache, the soft timeout indicating a period of time subsequent to a lapsing of which a corresponding fragment becomes stale, the hard timeout indicating a period of time subsequent to a lapsing of which a corresponding fragment is so stale as to be evicted from the fragment cache; and, computer usable program code for managing the fragment cache (A) by evicting fragments in the fragment cache subsequent to a lapsing of a corresponding hard timeout, and (B) by responding to multiple requests by multiple requestors for a stale fragment in the fragment cache with a lapsed corresponding soft timeout by returning the stale fragment from the fragment cache to some of the requestors, by retrieving and returning a new form of the stale fragment to others of the requestors, and by replacing the stale fragment in the fragment cache with the new form of the stale fragment with a reset soft timeout and hard timeout.

7. The computer program product of claim 6, wherein the computer usable program code for managing the fragment cache by a dual timer fragment caching module comprises:

computer usable program code for evicting fragments in the fragment cache subsequent to a lapsing of a corresponding hard timeout; and, computer usable program code for responding to multiple requests by multiple requestors for a stale fragment in the fragment cache with a lapsed corresponding soft timeout by returning the stale fragment from the fragment cache to all of the requestors but one of the requestors, by retrieving and returning a new form of the stale fragment to the one of the requestors, and by replacing the stale fragment in the fragment cache with the new form of the stale fragment with a reset soft timeout and hard timeout.

8. The computer program product of claim 6, wherein the computer usable program code for managing the fragment cache by a dual timer fragment caching module further comprises computer usable program code for responding to multiple requests by multiple requestors for a fragment in the fragment cache that is not stale and lacks a lapsed corresponding soft timeout by returning the fragment from the fragment cache to all of the requestors.

9. The computer program product of claim 6, wherein the computer usable program code for managing the fragment cache by a dual timer fragment caching module further comprises computer usable program code for responding to multiple requests by multiple requestors for a fragment not in the fragment cache by retrieving and returning the fragment to the requestors, and by adding the retrieved fragment to the fragment cache with a corresponding soft timeout and hard timeout.

* * * * *